United States Patent
Zutz

(10) Patent No.: US 6,494,459 B1
(45) Date of Patent: Dec. 17, 2002

(54) AXIAL FACE SEAL

(75) Inventor: Hans-Henning Zutz, Wermelskirchen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 09/715,006

(22) Filed: Nov. 20, 2000

(30) Foreign Application Priority Data

Nov. 20, 1999 (DE) .......................................... 199 55 860

(51) Int. Cl.[7] .................................................. F16J 15/38
(52) U.S. Cl. ......................................... 277/390; 277/394
(58) Field of Search ................................. 277/358, 370, 277/372, 390, 394, 397

(56) References Cited

U.S. PATENT DOCUMENTS

| | | | | |
|---|---|---|---|---|
| 2,894,770 A | * | 7/1959 | Payne | 277/394 |
| 3,542,377 A | * | 11/1970 | Voitik | 277/380 |
| 3,767,214 A | * | 10/1973 | Kawamura | 277/390 |
| 4,136,885 A | * | 1/1979 | Uhrner | 277/374 |
| 4,205,857 A | * | 6/1980 | Menager | 277/374 |
| 4,256,315 A | * | 3/1981 | Larson et al. | 277/394 |
| 5,199,719 A | * | 4/1993 | Heinrich et al. | 277/374 |

FOREIGN PATENT DOCUMENTS

GB 2177465 A * 1/1987 .................. 277/390

* cited by examiner

Primary Examiner—Anthony Knight
Assistant Examiner—Michael W White
(74) Attorney, Agent, or Firm—Venable; Norman N. Kunitz

(57) ABSTRACT

An axial face seal, in particular a running gear seal, consists of an angular sliding ring and/or counter-ring with a circumferential surface for accommodating a ring-shaped sealing member with approximately plate-shaped cross section. The sealing member contains a secondary seal guided in the area of the sealing leg, wherein the sealing leg of the sliding ring and/or counter-ring is provided on the ring backside with an axial projection extending in the direction of the sealing member. The secondary seal in the non-assembled state is positioned at a radial distance to the sealing leg or the projection and has at least in part a larger diameter than the sealing member. At least the free end of the secondary seal can be positioned with radial compression on the sealing leg or the projection with the aid of a component that accommodates the sealing member.

8 Claims, 1 Drawing Sheet

AXIAL FACE SEAL

CROSS-REFERENCE TO RELATED APPLICATIONS

This application claims the right of priority of German patent application No. 199 55 860.4 filed Nov. 20, 1999, the disclosure of which is incorporated herein by reference.

BACKGROUND OF THE INVENTION

The invention relates to an axial face seal, in particular a running gear seal, having an angular sliding ring and a circumferential surface designed to accommodate a ring-shaped sealing member. The sealing member comprises a secondary seal in the area of the sealing leg of the sliding ring.

U.S. Pat. No. 4,256,315 discloses an axial face seal of this type. In order to prevent dirt from entering the sliding surface area, the ring-shaped sealing member is provided with a secondary seal in the form of a sealing lip that is molded onto the sealing member, so as to form one piece. To be sure, this prevents dirt from entering the area between the back of the sliding ring and the sealing member, but causes problems with the pre-assembly and the final assembly of the seal, particularly with respect to the secondary seal, which has a material cross section that is designed to be considerably thinner than that of the sealing member itself. As a result of material fatigue of the sealing lip, it can therefore happen during operation that the internal stress provided for in the area of contact with the sealing leg may no longer be sufficient to ensure that dirt does not penetrate.

To correct this problem, German Patent Document No. C 197 53 918 discloses an axial face seal, for which the secondary seal is made of an inherently stable, pressure-resistant material that is designed as separate component, is connected to the sealing member and supports itself axially on the sealing leg. The sealing lip of the secondary seal can be pressed against the outside circumferential surface of the sealing leg with the aid of an element that is elastic in radial direction.

The use of an inherently stable, pressure-resistant material now permits reduced tolerances for the seat in the machine housing, so that a more secure seating is possible. However, the area where the sealing lip rests on the outside circumference of the sealing leg is still considered to be problematic. Owing to the spherical design of the outside circumferential surface of the sliding ring, it can happen that during the assembly of the sliding ring, the sealing lip of the secondary seal comes to rest against the smaller dimensioned lower region of the spherical circumferential surface. As a result, the spring force that is directed toward the inside is no longer sufficient to efficiently prevent dirt from entering.

SUMMARY OF THE INVENTION

It is an object of the invention to provide an axial face seal, so that in addition to a more precise transfer of rotational moments from the sealing member to the sliding ring, the sealing effect in the region between the secondary seal and sliding ring is increased. The increased sealing effect is the result of improved cooperation between sealing member, secondary seal and sliding ring.

This object and others to become apparent as the application progresses, are achieved according to the invention in that the sealing leg of the sliding ring has a ring back with an axial projection extending in the direction of the sealing member. The secondary seal in the unassembled state is designed to be at a radial distance to the sealing leg or the projection and has at least in part a larger diameter than the sealing member. At least a free end of the secondary seal can be positioned with radial compression against the sealing leg or the projection by a component that holds the sealing member.

At least the free end of the secondary seal can be provided with a larger outside diameter than the remaining region of the sealing member to effect the aforementioned radial compression in the assembled state. For example, the free end of the secondary seal may expand outward in a conical shape, starting with the area where it is connected to the sealing member.

In the unassembled state of the axial face seal, the secondary seal does not come in contact with the outside circumference of the sealing leg or its axially extended projection. The secondary seal is reduced to the outside diameter of the sealing member only after the sealing member has been pressed into a respective bore for holding it. The secondary seal then comes to rest with radial compression so that it is forced against the corresponding circumferential surface of the sealing leg or the projection.

To optimize the sealing effect in this region, it is suggested that sealing lips be formed on the secondary seal profile facing the outer circumferential surface of the sealing leg, which sealing lips may form gaps.

In the pre-assembled or partially assembled state of the sliding ring, grease may be inserted as an anti-grinding agent into a hollow space between sealing member, secondary seal and the region on the back of the sliding ring. The grease can be inserted via the gap that still exists between the secondary seal and the outside circumference of the sealing leg or its axial extension. However, adding the grease is not required.

To achieve an optimum twisting safety between the sliding ring and the sealing member, depressions can be provided on the ring back, if necessary distributed evenly over the circumference, which are preferably molded into the sealing leg of the sliding ring. Ridges that extend approximately in the axial direction are formed onto the sealing member and can subsequently engage in these depressions. They can thus serve as a twisting safety to prevent the sliding ring from slipping, relative to the sealing member, as a result of high rotational moments and the grease if inserted.

DETAILED DESCRIPTION OF THE PREFERRED EMBODIMENTS

Figure 1:
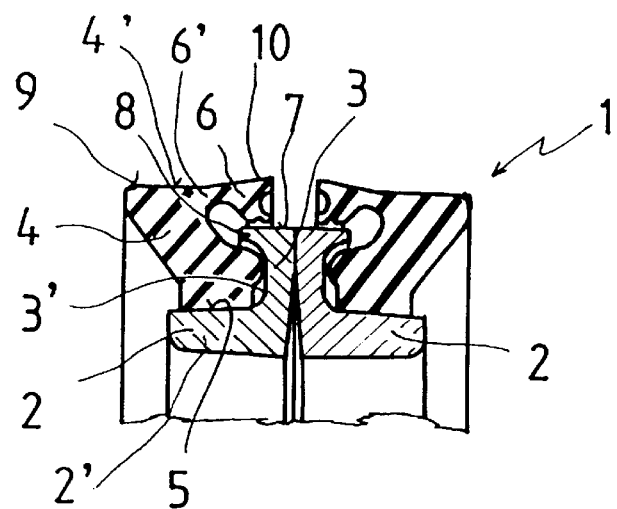
FIG. 1 is a cross-sectional view of a running gear seal according to the invention two sliding rings

FIG. 1 shows an axial face seal 1, consisting of two sliding rings 2 with identical structural geometry, so that henceforth reference is made only to one sliding ring 2. The sliding ring 2 has an angular cross section. The sliding ring has an axially extending supporting leg 2' and a radially extending sealing leg 3 axially adjoining the supporting leg 2'.

The sealing legs 3 of sliding rings 2 create a dynamic seal location. In the ring back region 3', the supporting leg 2' of the sliding ring 2 is provided with an approximately cylindrical circumferential surface 5 for accommodating a sealing member 4 in the shape of a plate spring. The sealing member 4 has an outer circumferential surface 4' and further comprises a secondary seal 6, which acts as a static seal in the installed state upon the outside circumference 7 of sealing leg 3. On the ring back, the sealing leg 3 is provided with an axial projection 8 that extends in the direction toward the sealing member 4. The secondary seal 6 consists of the same type of material as the sealing member 4 and forms one piece with the sealing member. The outside circumference 9 of sealing member 4 has a smaller diameter than the conically expanding region 10 of secondary seal 6. The connecting area is given the reference 6' and forms a type of joint owing to its small cross section, so that the secondary seal 6 can be pivoted radially toward the inside.

Figure 2:
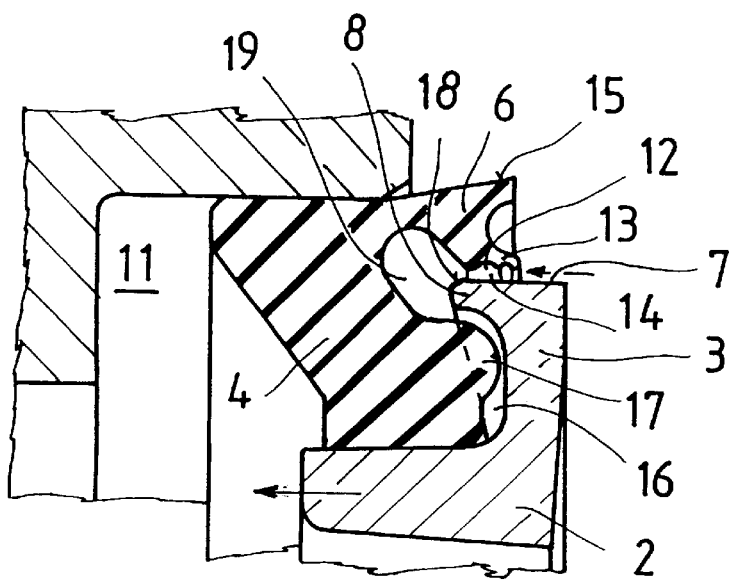
FIGS. 2 and 3 are enlarged views of the sliding ring according to FIG. 1 in various assembled states. seal according to the invention including two sliding rings.
Figure 3:
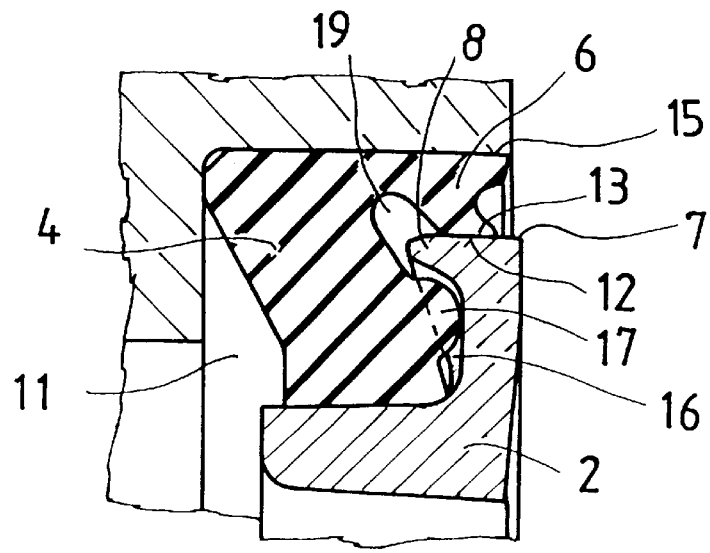

The FIGS. 2 and 3 show different assembly states for the sliding ring 2 inside a bore 11 of the housing. An arrow indicates the assembly direction on the side of the sliding ring.

FIG. 2 shows a partially assembled state, in which the sealing member 4 is at least in part already pressed into the housing bore 11 while the conically outward expanding secondary seal 6 still projects in radial direction past the circumference of the housing bore 11. The region 15 of secondary seal 6 in this case is designed as closing cone. In this state a gap 14 exists between the end region 13 of the secondary seal 6, which contains sealing lips 12, and the outside circumference 7 of sliding ring 2. The sealing leg 3 of sliding ring 2 is provided with the axial projection 8, which extends in the direction of the sealing member 4.

Depressions 16 are worked into the sealing leg 3 on the ring backside, starting with the projection 8, which serve as a twisting safety to prevent the sliding ring 2 from slipping relative to the sealing member 4. Corresponding ridges 17 that are molded onto the sealing member 4 engage in these depressions. For this embodiment, the free end of axial projection 8 is designed as slip-on chamfer 18, which prevents the inverting of the sealing member 4 while it is fitted onto the sliding ring 2. In this state of the assembly, grease can optionally be pressed by means of the still open gap 14 (see arrow) into the hollow space 19, formed between the sealing member 4, the secondary seal 6 and the axial projection 8. This grease functions as anti-grinding agent in case dirt enters the area.

FIG. 3 shows the sliding ring 2 with the sealing member 4, completely installed inside the housing bore 11. The hollow space 19 is then closed off because the end 13 of secondary seal 6, which is provided with the sealing lips 12, rests with radial compression on the outside circumference 7 of the sliding ring 2 or the axial projection 8, and the closing cone 15 now corresponds to the outside diameter of sealing member 4. The radial compression is forced onto the secondary seal 6 by the housing bore 11, which has a smaller diameter than the closing cone 15, so that manifestations of fatigue during operation are prevented. It is consequently impossible for dirt to enter from the outside. By compressing the secondary seal 6 to the installation dimension, the closing force between the sealing region 12 and the corresponding circumferential surface 7 of the sliding ring 2 is increased to such a degree that even following a longer operating period, dirt can be prevented securely from entering the region between the sliding ring 2 and the sealing member 4. In this state, the ridges 17 are positioned inside the associated molded-in depressions 16 of sliding ring 2, thus forming a safety against twisting to prevent the sliding ring 2 from sliding relative to the sealing member 4 because of high rotational moments and the grease stuffing that may exist in the hollow space, which could reduce the transferable rotational moment.

It will be understood that the above description of the present invention is susceptible to various modifications, changes and adaptations, and the same are intended to be comprehended within the meaning and range of equivalents of the appended claims.

What is claimed is:

1. An axial face seal comprising:
   (a) a sliding ring including
      (1) an axially extending supporting leg having an outer circumferential surface;
      (2) a radially extending sealing leg adjoining said supporting leg and having an outer circumferential surface;
   (b) an annular sealing member mounted on said outer circumferential surface of said supporting leg; said annular sealing member having an outer circumferential surface having a diameter;
   (c) a secondary seal provided on said annular sealing member and extending axially over said outer circumferential surface of said sealing leg; said secondary seal having an outer diameter; in an un-installed state of said axial face seal said outer diameter of said secondary seal being greater than said diameter of said outer circumferential surface of said annular sealing member and said secondary seal being radially spaced from said outer circumferential surface of said sealing leg, and in an installed state of said axial face seal said secondary seal being in a circumferential engagement with said outer circumferential surface of said sealing leg;
   (d) depressions provided in said sealing leg and oriented toward said annular sealing member; and
   (e) ridges provided on said annular sealing member and oriented toward said sealing leg; said ridges projecting into respective said depressions for preventing rotation of said annular sealing member relative to said sealing leg.

2. An axial face seal according to claim 1, wherein in the uninstalled state a free end of the secondary seal has a conically expanding diameter in a radially outward direction, starting with an area of connection of the secondary seal on the annular sealing member.

3. An axial face seal according to claim 1, wherein the secondary seal forms one piece with the annular sealing member.

4. An axial face seal according to claim 1, wherein an area of connection of the secondary seal on the annular sealing member has a smaller cross-sectional dimension than a free end of the secondary seal.

5. An axial face seal according to claim 1, in combination with a component surrounding and radially compressing said annular sealing member and said secondary seal in the installed state of the axial face seal.

6. An axial face seal according to claim 4, wherein said free end of said secondary seal has a sealing lip oriented toward said outer circumferential surface of said sealing leg of said sliding ring.

7. An axial face seal according to claim 1, further comprising a hollow space defined in part by said annular sealing member; said hollow space adjoining said secondary seal and being open toward said sealing leg of said sliding ring.

8. An axial face seal according to claim 1, wherein said outer circumferential surface of said sealing leg has a chamfer oriented toward said annular sealing member.

* * * * *